Patented Oct. 18, 1932

1,883,209

UNITED STATES PATENT OFFICE

WILLIAM R. WILLAUER, OF PHILADELPHIA, PENNSYLVANIA, ASSIGNOR TO MARATHON PAPER MILLS COMPANY, OF CHICAGO, ILLINOIS, A CORPORATION OF WISCONSIN

ADHESIVE

No Drawing.   Application filed May 5, 1930. Serial No. 450,062.

This invention relates to an adhesive, for use in the formation of joints in veneer, cloth, paper and the like, and more particularly in the formation of joints in sulphurized fiber board objects. The invention further contemplates a process for forming such an adhesive and a method for forming a joint with said adhesive to procure a strong bond between the joined parts.

Joints formed in cloth, paper and other fibrous material, and especially in sulphurized fiber board objects, by means of adhesives now in general use in the art have relatively low shearing and bursting strengths. In addition, these adhesives are not entirely water repellent and consequently when the joint is exposed to water for any length of time the bonding or adhesive property of said adhesives is reduced to such a point that the joint is easily ruptured.

I have now discovered an adhesive for use in forming joints which not only possesses water-repelling properties but also has a very high bonding strength with many and varied types of fibrous materials, including sulphurized fiber board. This is especially true when the joint is formed under pressure and heat as set out below.

It is accordingly an object of this invention to provide an adhesive which is substantially waterproof and possesses a high cementing or bonding strength with fibrous materials.

It is a further object of this invention to provide a process for forming such an adhesive.

Another object of this invention resides in the process of forming a joint with my new adhesive in such a way as to procure the maximum of strength in the joint.

Other and further important objects of this invention will become apparent from the following description and appended claims.

My adhesive comprises a suspension of casein and pulverized sulphur in water or other diluent. The amount of sulphur in the adhesive may vary from about 5 to 30% by weight of the casein, depending upon the particular fibrous material with which the adhesive is to be used. For instance, if the adhesive is to be used in forming a joint in fibrous material which contains no sulphur, the limits of the sulphur in the adhesive usually ranges from about 25 to 30% by weight of the casein. On the other hand, if the joint is to be formed between layers of sulphurized fiber board, the amount of sulphur in the adhesive will usually occupy the lower end of the above mentioned range. The amount of liquid employed to form the suspension will, of course, vary, depending upon the amount of casein and sulphur in the adhesive, but, in all cases, should be within such limits as to produce initially a thick suspension.

Generally, it is advisable to add a small quantity of ethyl alcohol with the water or other diluent, the commercial denatured variety being suitable. The alcohol decreases the time required by the joint for setting.

The following example in which parts by weight are given serves to illustrate the preferred composition of my adhesive for use with sulphurized fiber board.

200 parts of casein,
20 parts of flowers of sulphur,
270 parts of water,
24 parts of denatured alcohol.

To prepare an adhesive from these ingredients, the flowers of sulphur and casein are thoroughly mixed in a dry way. The water-alcohol solution is then added to the dry mixture, while stirring, to produce a thick suspension which thins out upon standing.

Casein, the major ingredient of the adhesive, deteriorates quite rapidly when wet upon exposure to the air, generally in a period of about eight hours. When mixed with sulphur, however, it resists attack by the atmosphere for a period in excess of seventy-two hours. It is, however, not advisable to permit the adhesive when made up to remain exposed to the atmosphere for any great length of time prior to using the same.

When forming a joint with this adhesive, the joined parts are subjected at the joint to pressure and an elevated temperature. The temperature is maintained between the limits of 240° F., at which the adhesive runs, and 270° F., above which the ingredients of the adhesive decompose. The pressure may vary over a wider range, pressures of from about 250 pounds to 800 pounds per square inch being suitable. For forming joints in fiber board cans, a pressure of 760 pounds per square inch is generally to be preferred.

The exact action of the heat and pressure upon the adhesive is not known, but it apparently causes a chemical combination to take place between the ingredients which results in the formation of products which are substantially unaffected by the atmosphere and which are strongly water-repellent. Moreover, the bacteria in the casein are rendered inert by this treatment.

A joint produced in this way has very high shearing and bursting strength. In addition, the joint has the capacity of effectively repelling attack by water. For instance, it has been found that such a joint would remain intact when in contact with boiling water up to a period of six hours.

It is further to be understood that various details of my disclosure may be varied without departing from the spirit of my invention, and accordingly I do not purpose to be limited in the patent granted except as necessitated by the prior art.

I claim as my invention:

1. The process of preparing an adhesive which comprises mixing 200 parts by weight of casein with 10 to 60 parts by weight of sulphur in a dry way and adding a solution of water and alcohol to such mixture to form a liquid suspension thereof.

2. As a new composition of matter, a suspension of a mixture of approximately 200 parts by weight of casein and approximately 10 to 60 parts by weight of sulphur in a water-ethyl alcohol solution.

3. As a new composition of matter, a suspension of a mixture of approximately 200 parts by weight of casein, approximately 20 parts by weight of flowers of sulphur, approximately 270 parts by weight of water and approximately 24 parts by weight of denatured alcohol.

In testimony whereof I have hereunto subscribed my name at Chicago, Cook County, Illinois.

WILLIAM R. WILLAUER.